United States Patent
Markov et al.

(10) Patent No.: US 9,716,366 B1
(45) Date of Patent: Jul. 25, 2017

(54) DEVICE, METHOD, AND SYSTEM FOR IMAGING LASER AMPLIFIER

(71) Applicant: Advanced Systems & Technologies, Inc., Irvine, CA (US)

(72) Inventors: Vladimir Markov, Irvine, CA (US); Anatoliy Khizhnyak, Irvine, CA (US)

(73) Assignee: Advanced Systems & Technologies, Inc., Irvine, CA (US)

( * ) Notice: Subject to any disclaimer, the term of this patent is extended or adjusted under 35 U.S.C. 154(b) by 0 days.

(21) Appl. No.: 15/004,575

(22) Filed: Jan. 22, 2016

(51) Int. Cl.
| | | |
|---|---|---|
| *H01B 3/10* | (2006.01) | |
| *G01S 17/66* | (2006.01) | |
| *H01S 3/10* | (2006.01) | |
| *H01S 3/106* | (2006.01) | |
| *G01S 17/89* | (2006.01) | |

(52) U.S. Cl.
CPC .......... *H01S 3/1003* (2013.01); *G01S 17/66* (2013.01); *G01S 17/89* (2013.01); *H01S 3/106* (2013.01); *H01S 3/10061* (2013.01)

(58) Field of Classification Search
CPC .... H01S 3/1003; H01S 3/10061; G01S 17/66; G01S 17/89
See application file for complete search history.

(56) References Cited

U.S. PATENT DOCUMENTS

| | | | | |
|---|---|---|---|---|
| 6,504,969 B1* | 1/2003 | Tsao | ....................... | G02F 1/3132 385/15 |
| 7,609,437 B2* | 10/2009 | Seki | .................... | H01S 3/06758 359/333 |
| 8,953,647 B1* | 2/2015 | Mead | ................... | H01S 3/06754 12/94 |
| 9,405,070 B1* | 8/2016 | de Valicourt | ........ | G02B 6/2861 |
| 2008/0310859 A1* | 12/2008 | Cai | ..................... | H04B 10/2935 398/160 |

* cited by examiner

*Primary Examiner* — Eric Bolda
(74) *Attorney, Agent, or Firm* — Snell & Wilmer LLP (57) ABSTRACT

An optical image amplifier device capable of amplifying low-intensity backscattered illumination includes an optical port having an input, an output, and a controller having an ON state and an OFF state, the controller connecting the input and the output to form an optical loop in the ON state and disconnecting the input and the output in the OFF state, and an optical relay housing the optical loop and connected to the optical port having a gain medium configured for amplifying a signal beam propagating inside the optical loop in the ON state.

16 Claims, 4 Drawing Sheets

DEVICE, METHOD, AND SYSTEM FOR IMAGING LASER AMPLIFIER

STATEMENT REGARDING GOVERNMENT RIGHTS

This invention was made with Government support under Contract No. FA9453-13-C-0118 awarded by the United States Air Force. The Government has certain rights in this invention.

BACKGROUND

1. Field of the Invention

The present invention relates generally to optics and more particularly, to coherent optical amplifiers of a light field scattered by an object that is not just a signal beam, and can be used to perform surveillance, and active or passive tracking of the object.

2. Description of the Related Art

Active laser surveillance (ALS) can be used for tracking and comprehensive characterization of distant objects. For example, ALS can be used for active and passive space surveillance for pinpointing relatively small but still potentially devastating meteorites, comets, and debris that threaten to strike terrestrial or manmade space objects, such as a spacecraft. Early detection of these objects would provide an advanced alert to allow time for safety actions, such as evacuation of threatened areas on the ground or change of orbital parameters in the case of spacecraft. However, considering the distances involved, active detection and imaging of such remote objects remains a task that is very difficult to fully achieve due to the low level of intensity of backscattered light signals. Attempts to amplify the backscattered light by using currently available methods result in amplification of the noise associated with the signal, and so is of limited use.

Similar issues arise regarding imaging and surveillance of ground facilities or objects of interest, such as state borders, military bases, ports, bridges, reservoirs, and in the private sector, such as sports arenas, airports, malls, industrial buildings, and other large public buildings. For example, when used for a covert surveillance mission, low-level illumination intensity is preferred to reduce the probability of its detection from the object under surveillance. However, this low-level illumination intensity results in a low-intensity backscattered light field which makes it harder to detect by the surveillance module. Other scenarios that require low-intensity coherent imaging include behavioral studies of live species and microorganisms that often do not tolerate a high-intensity illumination.

Accordingly, there is a need for a system and method of amplifying a laser signal that overcomes the shortcomings stated above.

SUMMARY OF THE INVENTION

The contents of this summary section are provided only as a simplified introduction to the invention, and are not intended to be used to limit the scope of the appended claims. The present disclosure has been described above in terms of presently preferred embodiments so that an understanding of the present disclosure can be conveyed. However, there are other embodiments not specifically described herein for which the present disclosure is applicable. Therefore, the present disclosure should not be seen as limited to the forms shown, which should be considered illustrative rather than restrictive.

The present invention aims to address the above-cited limitations in the current state-of-the-art ALS by providing the ability to amplify a low-intensity backscattered light field by successively amplifying the light field through an optical loop also referred to herein as an optical cavity. Further in this invention we refer to this object scattered light that carries information on the object, including its imagery data, as a signal beam. A signal beam is received at an input of the amplifier device and is allowed to propagate through an optical relay containing a gain medium. A controller is toggled into an ON state to trap the signal beam within the optical relay so that the signal beam follows an optical loop to become amplified through successive passes through the gain medium. After a desired level of amplification of the signal beam is achieved, the controller is toggled into an OFF state and an amplified signal beam is outputted from the amplifier.

An exemplary embodiment of the present invention's optical image amplifier device capable of amplifying low-intensity backscattered illumination comprises an optical port having an input, an output, and a controller having an ON state and an OFF state, the controller connecting the input and the output to form an optical loop in the ON state and disconnecting the input and the output in the OFF state, and an optical relay housing the optical loop and connected to the optical port having a gain medium configured for amplifying a signal beam propagating inside the optical loop in the ON state.

In related versions, the controller is positioned between a first polarizer and a second polarizer, the controller further comprising a half-wave plate and an electronically controlled wave plate.

In related versions, the input comprises input optics for inputting the signal beam into the optical relay.

In related versions, the optical relay further comprises a plurality of image formation optics.

In related versions, the first polarizer is positioned adjacent to a first side of the electronically controlled wave plate and configured to reflect the signal beam when the electronically controlled wave plate is in the ON state.

In related versions, the second polarizer is positioned adjacent to a second side of the electronically controlled wave plate and configured to reflect the signal beam when the electronically controlled wave plate is in the ON state.

In related versions, the optical relay includes a first mirror positioned adjacent to a first side of the gain medium and at an angle relative to the second polarizer and configured to reflect the signal beam from the second polarizer to the gain medium.

In related versions, the optical relay includes a second mirror positioned adjacent to a second side of the gain medium and positioned at an angle relative to the first polarizer and configured to reflect the amplified signal beam received from the gain medium to the first polarizer.

In related versions, the output comprises output optics for outputting an amplified signal beam.

An exemplary embodiment of the present invention's method for amplification of low intensity backscattered illumination comprises the steps of inputting the light beam into an input of an optical port when a controller set is in an OFF state, switching the controller to an ON state to create an optical loop within the optical port and an optical relay to trap the light beam, amplifying the light beam through successive passes through the optical loop, switching the controller to the OFF state to allow the amplified light beam to be output, and outputting the amplified light beam through an output of the optical port.

In related versions, the method further comprises, after inputting the light beam into the input, propagating the light beam through an optical relay to fill the optical relay with the light beam.

In related versions, the method further comprises, after propagating the light beam, outputting the light beam through the output of the optical port.

In related versions, the input comprises input imaging optics, the optical relay comprises a plurality of image formation optics, and the output comprises output imaging optics.

An exemplary embodiment of the present invention's system for amplification of low intensity backscattered illumination comprises a system for amplifying a signal beam comprising an amplifier device comprising an optical port having an input, an output, and a controller having an ON state and an OFF state, the controller connecting the input and the output to form an optical loop in the ON state and disconnecting the input and the output in the OFF state, and an optical relay housing the optical loop and connected to the optical port having a gain medium configured for amplifying the signal beam propagating inside the optical loop in the ON state, a processor for processing the amplified signal beam to generate an image, and a display for displaying the generated image.

In related versions, the controller comprises an electronically controlled wave plate having an ON state and an OFF state.

In related versions, the amplifier device further comprises a first polarizer positioned adjacent to a first side of the electronically controlled wave plate and configured to reflect the signal beam when the electronically controlled wave plate is in the ON state, and a second polarizer positioned adjacent to a second side of the electronically controlled wave plate and configured to reflect the signal beam when the electronically controlled wave plate is in the ON state.

In related versions, the amplifier device further comprises a gain medium configured for receiving the signal beam and amplifying the signal beam to produce an amplified signal beam, a first mirror positioned adjacent to a first side of the gain medium and at an angle relative to the second polarizer and configured to reflect the signal beam from the second polarizer to the gain medium, and a second mirror positioned adjacent to a second side of the gain medium and positioned at an angle relative to the first polarizer and configured to reflect the amplified signal beam received from the gain medium to the first polarizer.

In related versions, the amplifier device further comprises a first imaging lens positioned between the second polarizer and the first mirror, and a second imaging lens positioned between the first polarizer and the second mirror.

BRIEF DESCRIPTION OF THE DRAWINGS

Other systems, methods, features and advantages of the present invention will be or will become apparent to one of ordinary skill in the art upon examination of the following figures and detailed descriptions. It is intended that all such additional apparatuses, systems, methods, features and advantages be included within this description, be within the scope of the present invention, and be protected by the appended claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1A:
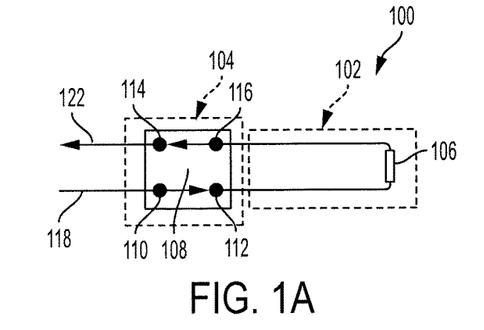
FIG. 1A is a schematic diagram depicting an exemplary embodiment of the present invention's device for imaging laser amplification.

FIG. 1A is a schematic diagram depicting an exemplary embodiment of the present invention's device for imaging laser amplification. The present invention's device represents a novel way of amplifying a signal beam. The present invention's device achieves this outcome by successively amplifying the signal beam through a closed optical loop. Specifically, the present invention's device incorporates optics components and a controller for controlling opening and closing of the optical loop. The exemplary embodiment of FIG. 1A captures these novel features of the present invention's system.

Figure 1B:
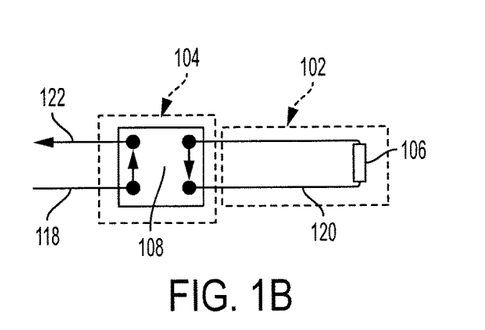
FIG. 1B is a schematic diagram depicting an exemplary embodiment of the present invention's device for imaging laser amplification.
Figure 1C:
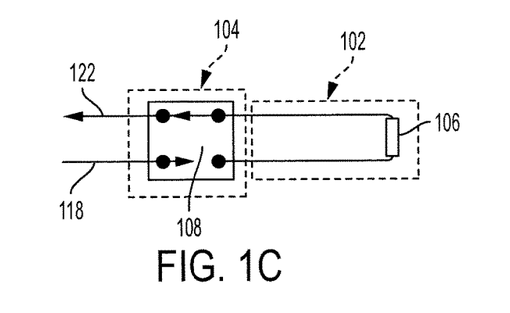
FIG. 1C is a diagram depicting an exemplary embodiment of the present invention's device for imaging laser amplification.

In the exemplary embodiment of the present invention's device in FIGS. 1A-1C, a device 100 has an optical relay 102 coupled to an optical port 104. The optical relay 102 comprises a gain medium 106. The gain medium 106 can be any active laser medium (e.g., a laser rod, semiconductor crystal, etc.) known in the art for its ability to amplify the power of light typically in the form of a light beam. The optical port 104 comprises a controller 108, a first input port 110, a second input port 112, a first output port 114, and a second output port 116. The controller 108 can have an ON state and an OFF state that rotates a polarization of a signal beam that passes through.

Low intensity light scattered off of a laser illuminated object and received by device 100 can be a signal beam 118. The signal beam 118 can be backscattered light that includes image information relating to the object. The signal beam 118 can comprise a light beam. In related versions, the signal beam 118 can further comprise an image of the object formed by the input and output imaging optics of the optical relay 102. The signal beam 118 is received by the optical port 104 and passes through the first input port 110 and the second input port 112 to the optical relay 102. When the controller 108 is in the OFF state, as depicted in FIG. 1A, the signal beam 118 passes through the gain medium 106 and back out through the second output port 116 and the first output port 114. When the controller 108 is switched to the ON state, as depicted in FIG. 1B, the first input port 110 becomes connected to the first output port 114 and the second input port 112 becomes connected to the second output port 116, trapping the signal beam 118 in a loop 120 between the optical port 104 and the optical relay 102. While the signal beam 118 is trapped within the loop 120, the signal beam 118 repeatedly passes through the gain medium 106. This happens for as long as the controller 108 is in the ON state. Switching the controller 108 back to the OFF state, as depicted in FIG. 1C, reconnects the first input port 110 to the second input port 112 and the first output port 114 to the second output port 116, outputting an amplified signal beam 122.

Advantages include amplification of a signal beam with a complex wavefront and an arbitrary wavelength within the bandwidth of the gain medium without adjustment to longitudinal modes of the cavity that forms the amplifying loop 120, reduction in pumping power applied to the gain medium that results in a reduced level of thermal load and a lower level of thermally induced aberrations, allows control over amplification by controlling how many loops the signal beam makes, amplification is not dependent on a high amplification from a single round trip, and saves space because optical elements that comprise the loop do not have to be recurrent. Thus, the approach described herein allows for amplification of laser pulses with no limits on their spectral composition. It can therefore be useful for a broad range of applications where intensity enhancement of a wide-angle signal is of interest, such as the amplification of low-intensity coherent images in space surveillance, microscopy, biology, etc.

Additionally, as will be described in greater detail below, optical conditioning elements can be incorporated into the optical relay 102 to reduce signal noise and produce a cleaner signal.

Figure 2A:
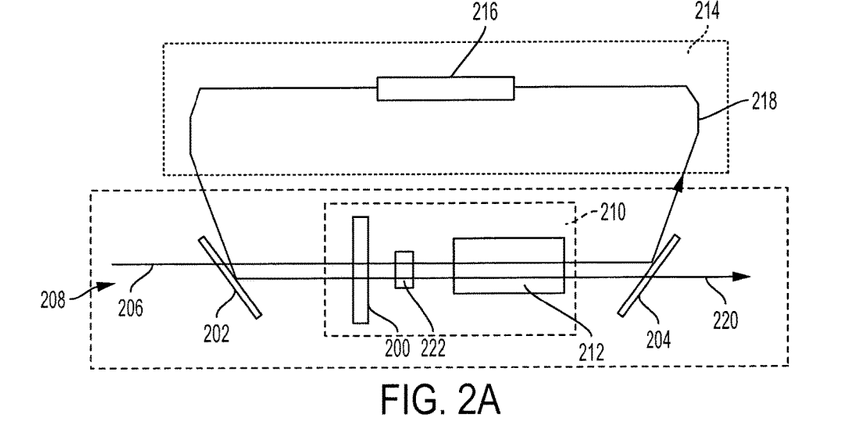
FIG. 2A is a schematic diagram depicting another exemplary embodiment of an alternative version of the present invention's device for imaging laser amplification.
Figure 2B:
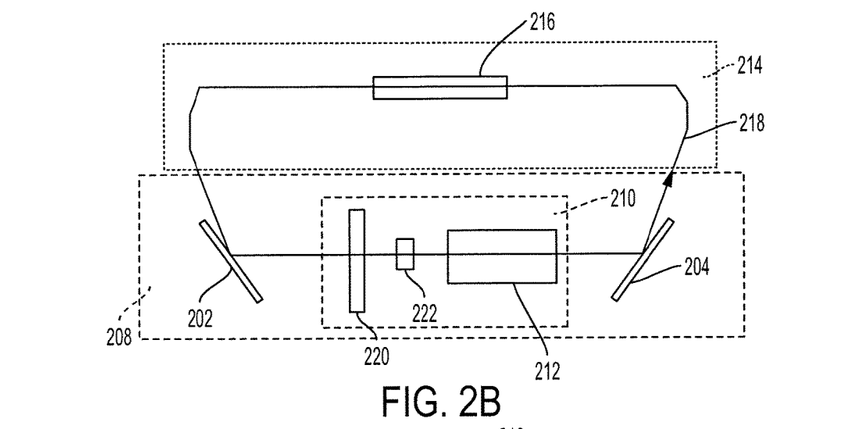
FIG. 2B is a schematic diagram depicting another exemplary embodiment of an alternative version of the present invention's device for imaging laser amplification.
Figure 2C:
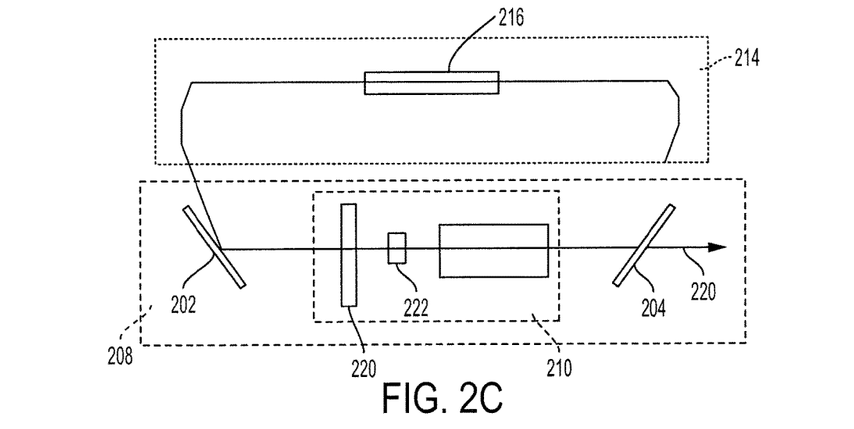
FIG. 2C is a schematic diagram depicting another exemplary embodiment of an alternative version of the present invention's device for imaging laser amplification.

FIGS. 2A-2C are schematic diagrams depicting an exemplary embodiment of an alternative version of the present invention's device for imaging laser amplification. As shown in FIG. 2A, a signal beam 206 can be received at an optical port 208 from a different direction than in FIG. 1. The optical port 208 can comprise a controller 210 comprising a half-wave plate 200, an angular selector 222, and an electronically controlled wave plate 212. The electronically controlled wave plate 212 can be any electronically controlled wave plate known in the art, such as a Pockels cell, with an ON state and an OFF state that rotates a polarization of a signal beam that passes through. The ON state and OFF state of the electronically controlled wave plate 212 corresponds to the ON state and the OFF state of the controller 210. The half-wave plate 200 can be any wave plate known in the art that shifts a polarization of a signal beam by 180 degrees. The angular selector 222 is for limiting a field of view (FOV) of the device 200 to suppress noise associated with amplified spontaneous emission (ASE). The controller 210 can be positioned within the optical port 208 between a first polarizer 202 and a second polarizer 204. The first polarizer 202 and the second polarizer 204 can be any polarizer known in the art, such as an optical filter that passes light of a specific polarization and blocks waves of other polarizations. In some versions, the first polarizer 202, the half-wave plate 200, the electronically controlled wave plate 212, and the second polarizer 204 can be arranged in a straight line, as depicted in FIGS. 2A-2C.

When the electronically controlled wave plate 212 is in the OFF state, thus also putting the controller 210 in the OFF state, as depicted in FIG. 2A, the signal beam 206 has a polarization that causes it to pass through the first polarizer 202. The polarization of the signal beam 206 is then shifted 180 degrees by the half-wave plate 200, and is reflected by the second polarizer 204 into the optical relay 214. The signal beam 206 passes through a gain medium 216 and is reflected by the first polarizer 202 through the half-wave plate 200, where the polarization of the signal beam 206 is once again shifted 180 degrees by the half-wave plate 200 so that the signal beam 206 passes through the second polarizer 204. In all, the signal beam 206 makes only one pass through the gain medium 216 of the optical relay 214 before exiting out from the optical port 208.

When the electronically controlled wave plate 212 is switched to the ON state, thus also putting the controller 210 in the ON state, as depicted in FIG. 2B, the controller 210 shifts the polarization of the signal beam 206 so that it becomes trapped in a loop 218 for as long as the controller 210 is in the ON state. As a result, the signal beam 206 makes multiple passes through the gain medium 216, as well as the other above-described components, for amplification and conditioning of the signal beam 206.

When the electronically controlled wave plate 212 is switched back to the OFF state, also putting the controller 210 back in the OFF state, as depicted in FIG. 2C, the polarization of the signal beam 206 is no longer shifted for continuous passes through the loop 218, and an amplified signal beam 220 is outputted.

Figure 3:
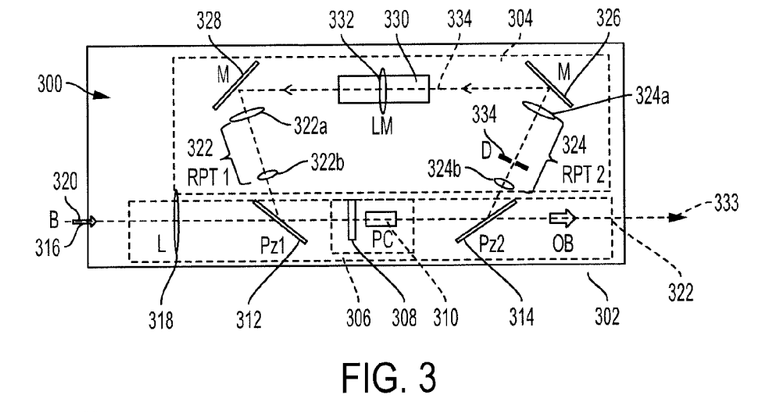
FIG. 3 is a schematic diagram depicting another exemplary embodiment of an alternative version of the present invention's device for imaging laser amplification.

FIG. 3 is a schematic diagram depicting an exemplary embodiment of an alternative version of the present invention's device for imaging laser amplification. The device 300 can comprise an optical port 302 coupled to an optical relay 304. The optical port 302 can further comprise a controller 306 positioned between a first polarizer 312 and a second polarizer 314. The controller 306 can comprise a half-wave plate 308 and an electronically controlled wave plate 310, similar to what is described and depicted above in FIGS. 2A-2C. The optical port 302 can also comprise an input port 316, output port 322, and input optics 318. The input port 316 and the output port 322 can be apertures defined by optical port 302, and input optics 318 can be an optical lens as known in the art for conditioning a signal beam 320. In some versions, the input port 316, input optics 318, first polarizer 312, half-wave plate 308, electronically controlled wave plate 310, second polarizer 314, and output port 322 can be arranged in a straight line, as shown in FIG. 3.

The optical relay 304 can comprise a first imaging lens 322, a second imaging lens 324, a first mirror 326, a second mirror 328, and a gain medium 330. The first imaging lens 322 and the second imaging lens 324 can comprise optical repeaters having a pair of concentric lenses 322a and 322b, and 324a and 324b, such that lenses 322a and 324a have a same focal point f1, and 322b and 324b have a same focal point f2. The second imaging lens 324 can further comprise a diaphragm 334 positioned between lenses 324a and 324b for limiting an amount of light that passes through.

The device 300 functions substantially similar to what has been described above. When the controller is in the OFF state, the signal beam 320 passes through the input port 316, input optics 318, the first polarizer, the half-wave plate 306, and the electronically controlled wave plate 310 in that order. Because a polarization of the signal beam 320 is rotated 180 degrees by the half-wave plate 306, the signal beam is reflected by the second polarizer 314 through the second repeater 324 to the first mirror 326. The first mirror 326 then reflects the signal beam 320 through the gain medium 330 and to the second mirror 328, where the signal beam 320 is reflected back to the first polarizer 312. The first polarizer 312 then reflects the signal beam 320 through the half-wave plate 306 to rotate the polarization of the signal beam 320 180 degrees so that the signal beam 320 it outputted through the output port 322.

When the controller 306 is in the ON state, the electronically controlled wave plate shifts the polarization of the signal beam 320 such that the signal beam 320 becomes trapped within optical loop 334 that is defined by the optical elements of the optical port 302 and the optical relay 304. Through successive passes through the gain medium 330, the signal beam 320 becomes amplified. When the controller 360 is switched back to the OFF state, an amplified signal beam 333 is outputted through the output port 322.

Figure 4:
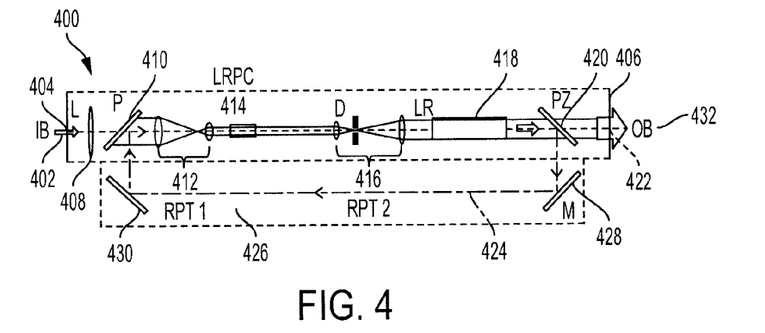
FIG. 4 is a schematic diagram depicting another exemplary embodiment of an alternative version of the present invention's device for imaging laser amplification.

FIG. 4 is a schematic diagram depicting an exemplary embodiment of an alternative version of the present invention's device for imaging laser amplification. The main difference between device 400 and device 300 is that the first and second repeaters and gain medium are positioned between the first and second polarizers. An advantage of the device of FIG. 4 over the other described versions is that the angle of view can potentially be narrowed using this arrangement.

For example, signal beam 402 enters optical port 404 through input port 406 and passes through input optics 408, first polarizer 410, first repeater 412, electronically controlled wave plate 414 in the OFF state, second repeater 416, gain medium 418, and second polarizer 420, and outputted through output port 422. When the electronically controlled wave plate is switched to the ON state, the signal beam 402 becomes trapped within loop 424 such that the signal beam 402 makes successive passes through the gain medium 418. The signal beam 402 passes through the optical components of the optical relay 426 and is reflected by the second polarizer 420 toward a first mirror 428 positioned within the optical relay 426. The first mirror 428 then reflects the signal beam towards a second mirror 430, also positioned within the optical relay 426. The second mirror 430 then reflects the signal beam 402 back to the first polarizer 410 positioned within the optical port 406, where the signal beam completes the loop 424. Switching the electronically controlled wave plate to the OFF state allows outputting of an amplified signal beam 432.

As depicted in FIG. 4, the electronically controlled wave plate 414, and the gain medium 418, can potentially narrow the angle of view and thus are positioned between the first repeater 412 and the second repeater 416. The input optics 408 forms a remote object image on the first repeater 412.

The scheme shown in FIG. 4 allows the amplifier's angle of view increased to the maximum value determined by the geometrical size of the electronically controlled wave plate 414 and the gain medium 418 according to the following equation:

$$\theta_{AV} = D_{OE} \cdot n_{OE} | L_{OE}, \quad (1)$$

where $D_{OE}$, $n_{OE}$, and $L_{OE}$ are respectively, the diameter, the refractive index, and the length of the optical element, and $\theta_{AV}$ is the angle of view.

The number of resolved elements in an amplified image (m) is determined by the ratio of the amplifier's angle of view and diffraction on the optical element's aperture:

$$m = \frac{\theta_{AV}}{\theta_d} = \frac{D_{OE}^2 \cdot n_{OE}}{1.22 \cdot \lambda \cdot L_{OE}} = \frac{n_{OE}}{1.22} \cdot N_{Fr}, \quad (2)$$

where $\lambda$ is the wavelength of the signal beam 402. It follows from Eq. (2) that the number of the resolved elements in the amplified image is determined by the Fresnel number ($N_{Fr}$) of the optical element. Therefore, the amplifier's angle of view is determined by the optical element with the lowest Fresnel number.

Figure 5:
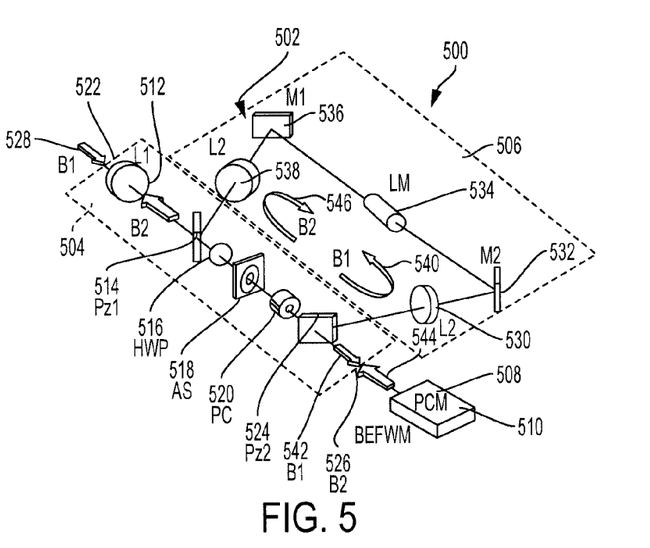
FIG. 5 is a schematic diagram depicting an exemplary embodiment of the present invention's system for imaging laser amplification.

FIG. 5 is a schematic diagram depicting an exemplary embodiment of the present invention's system for imaging laser amplification. System 500 can comprise an amplifier device 502 having an optical port 504, and an optical relay 506, a processor 508, and a display 510. The processor 508 and display 510 can be a computer and monitor as well-known in the art.

The optical port 504 can comprise an input port 522, an input lens 512, a first polarizer 514, a half-wave plate 516, an angular selector 518, an electronically controlled wave plate 520 having an ON state and an OFF state, a second polarizer 524, and an output port 526.

The optical relay can comprise a first imaging lens 530, a first mirror 532, a gain medium 534, a second mirror 536, and a second imaging lens 538. The first imaging lens 530 and the second imaging lens 538 can comprise a pair of concentric imaging lenses as described above with corresponding focal points. The gain medium 534 can be any lasing medium known in the art and described above for amplification of a laser signal.

When the electronically controlled wave plate 520 is in the OFF state, a signal beam 528 can be received by the amplifier 502 makes one loop 540 through the optical elements, pursuant to the descriptions above. The signal beam 528 can be backscattered light containing information regarding an image of an object. When the electronically controlled wave plate 520 is switched to the ON state, the signal beam 528 becomes trapped within the loop 540 and is amplified by successive trips through the gain medium 534. When the electronically controlled wave plate 520 is switched back to the OFF state, an amplified signal beam 542 is outputted from the amplifier device 502. The amplified signal beam 542 is then received by the processor 508 and processed to create an image of an object. The image is then displayed on the display 510. The image can be a live video feed of the object.

In related versions, the amplified signal beam 542 can have two components: the amplified signal and the amplified spontaneous emission (ASE). Two possible scenarios of the amplified signal beam 542 can result: (i) $P_S \gg P_{ASE}$, and (ii) $P_S \leq P_{ASE}$, where $P_S$ is the power of the signal beam 528 and $P_{ASE}$ is the power of the ASE after a single round trip through the gain medium 534. In case (i), the ASE does not affect the amplified signal, but in case (ii), the amplified signal is separated from the ASE. This can be achieved by applying the phase conjugate mirror (PCM) technique with its implementation in a Brillouin-enhanced four-wave mixing (BEFWM) scheme, as known in the art, to generate a phase conjugate beam 544. The PCM technique and the BEFWM method may be executed at the processor 508.

The resulting phase conjugate beam 544 contains the ASE and is backward reflected and injected into the output port 526 of the amplifier device 502. When the electronically controlled wave plate is in the ON state, the phase conjugate beam 544 propagates through reverse loop 546 in an opposite direction as loop 540, and the phase conjugate beam 544 circulates the same number of round trips as the original signal beam 528. In this way, the phase conjugate beam 544 compensates for aberrations resulting from amplification of the signal beam 528, and then is further amplified and pulled out of the cavity though input lens 512 and input port 522, after the electronically controlled wave plate is turned OFF. Upon its exit, the phase conjugate beam 544 reconstructs the structure of signal beam 528 with phase conjugation and amplification.

Figure 6:
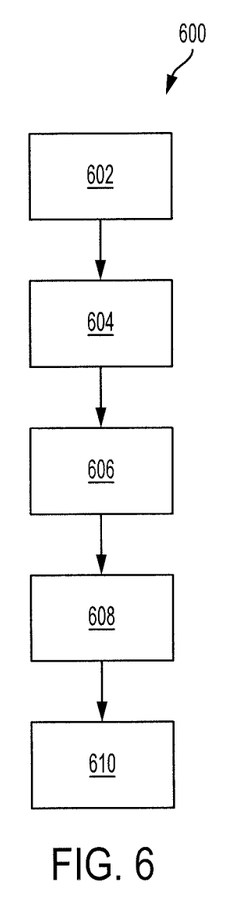
FIG. 6 is a flowchart depicting an exemplary embodiment of the present invention's method for imaging laser amplification.

FIG. 6 is a flowchart depicting an exemplary embodiment of the present invention's method for imaging laser amplification. This present invention's method, such as method 600, provides the ability to amplify a signal beam through successive loops in an optical cavity.

As shown in FIG. 6, method 600 comprises steps 602 to 610. At step 602, a light beam is received by the laser amplifier device through an input of an optical port when a controller set in an OFF state. Various exemplary embodiments of the present invention's optical port and controller, as depicted in FIGS. 1A-5 and described above. In related versions, the input can comprise input imaging optics.

At step 604, the controller is switched to an ON state to create an optical loop within the optical port and an optical relay to trap the light beam. In related versions, the optical relay can comprise a plurality of image formation optics.

At step 606, the light beam is amplified through successive passes through the optical loop. A number of passes can be determined by how much amplification is needed to generate a clear image. A greater number of passes will yield a higher level of amplification of the signal beam. In related versions, the number of passes can be monitored and adjusted to generate a clear image from the light beam. For example, an incremental power of the signal beam is monitored as it circulates inside the closed loop.

At step 608, the controller is switched to the OFF state to allow the amplified light beam to be output. In related versions, the controller can comprise an electronically controlled wave plate with an ON state and an ON state and a half-wave plate.

At step 610 the amplified light beam is output through an output of the optical port. In related versions, the output can comprise output imaging optics to condition the amplified output signal.

In related versions, the method can further include, after inputting the light beam into the input, propagating the light beam through an optical relay to fill the optical relay with the light beam.

In related versions, the method can further include, after propagating the light beam, outputting the light beam through the output of the optical port.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted.

What is claimed is:

1. An optical image amplifier device, comprising:
an optical relay housing an optical loop and having a gain medium; and
an optical port connected to the optical relay and having an input that includes input optics for inputting a signal beam into the optical relay, an output that includes output optics for outputting the signal beam after being amplified, and a controller having an ON state and an OFF state, the controller connecting the input and the output to form the optical loop in the ON state and disconnecting the input and the output in the OFF state, the gain medium being configured to amplify the signal beam propagating inside the optical loop when the controller is in the ON state.

2. The amplifier device of claim 1 wherein the controller is positioned between a first polarizer and a second polarizer, the controller further comprising:
a half-wave plate and an electronically controlled wave plate.

3. The amplifier device of claim 1 wherein the optical relay further comprises a plurality of image formation optics.

4. The amplifier device of claim 2 wherein the first polarizer is positioned adjacent to a first side of the electronically controlled wave plate and configured to reflect the signal beam when the electronically controlled wave plate is in the ON state.

5. The amplifier device of claim 4 wherein the second polarizer is positioned adjacent to a second side of the electronically controlled wave plate and configured to reflect the signal beam when the electronically controlled wave plate is in the ON state.

6. The amplifier device of claim 5 wherein the optical relay includes a first mirror positioned adjacent to a first side of the gain medium and at an angle relative to the second polarizer and configured to reflect the signal beam from the second polarizer to the gain medium.

7. The amplifier device of claim 6 wherein the optical relay includes a second mirror positioned adjacent to a second side of the gain medium and positioned at an angle relative to the first polarizer and configured to reflect the amplified signal beam received from the gain medium to the first polarizer.

8. A method of amplifying an intensity of a light beam, comprising:
inputting the light beam into an input of an optical port that has input imaging optics when a controller is set in an OFF state;
switching the controller to an ON state to create an optical loop within the optical port and an optical relay to trap the light beam;
amplifying the light beam through successive passes through the optical loop;
switching the controller to the OFF state to allow the amplified light beam to be output; and
outputting the amplified light beam through an output of the optical port that has output imaging optics.

9. The method of claim 8 further comprising, after inputting the light beam into the input, propagating the light beam through an optical relay to fill the optical relay with the light beam.

10. The method of claim 9 further comprising, after propagating the light beam, outputting the light beam through the output of the optical port.

11. The method of claim 8 wherein the optical relay comprises a plurality of image formation optics.

12. A system for amplifying a signal beam comprising:
an amplifier device, comprising:
an optical port having an input, an output, and a controller having an ON state and an OFF state, the controller connecting the input and the output to form an optical loop in the ON state and disconnecting the input and the output in the OFF state; and an optical relay housing the optical loop and connected to the optical port having a gain medium configured for amplifying the signal beam propagating inside the optical loop in the ON state;

a processor for processing the amplified signal beam to generate an image; and a display for displaying the generated image.

13. The system of claim 12 wherein the controller comprises an electronically controlled wave plate having an ON state and an OFF state.

14. The system of claim 13 wherein the amplifier device further comprises:

a first polarizer positioned adjacent to a first side of the electronically controlled wave plate and configured to reflect the signal beam when the electronically controlled wave plate is in the ON state; and a second polarizer positioned adjacent to a second side of the electronically controlled wave plate and configured to reflect the signal beam when the electronically controlled wave plate is in the ON state.

15. The system of claim 14 wherein the amplifier device further comprises:

a gain medium configured for receiving the signal beam and amplifying the signal beam to produce an amplified signal beam;

a first mirror positioned adjacent to a first side of the gain medium and at an angle relative to the second polarizer and configured to reflect the signal beam from the second polarizer to the gain medium; and a second mirror positioned adjacent to a second side of the gain medium and positioned at an angle relative to the first polarizer and configured to reflect the amplified signal beam received from the gain medium to the first polarizer.

16. The system of claim 15 wherein the amplifier device further comprises:

a first imaging lens positioned between the second polarizer and the first mirror; and a second imaging lens positioned between the first polarizer and the second mirror.

\* \* \* \* \*